United States Patent [19]

Takezoe

[11] 4,034,351
[45] July 5, 1977

[54] METHOD AND APPARATUS FOR TRANSMITTING COMMON INFORMATION IN THE INFORMATION PROCESSING SYSTEM

[75] Inventor: Fumihiko Takezoe, Kawasaki, Japan

[73] Assignee: Fuji Electric Company Ltd., Kawasaki, Japan

[22] Filed: Feb. 12, 1976

[21] Appl. No.: 657,662

[30] Foreign Application Priority Data

Feb. 12, 1975  Japan .............................. 50-17628

[52] U.S. Cl. ........................... 364/200; 340/147 R; 179/15 AL
[51] Int. Cl.² ...................... G06F 3/04; G06F 7/10; G06F 9/19; G08B 11/00
[58] Field of Search .................... 340/147 R, 172.5; 445/1; 179/15 AL; 178/3

[56] References Cited

UNITED STATES PATENTS

| | | | |
|---|---|---|---|
| 3,697,959 | 10/1972 | Abramson et al. ............. | 340/172.5 |
| 3,699,529 | 10/1972 | Beyers et al. .................... | 340/172.5 |
| 3,723,971 | 3/1973 | Betts et al. ................. | 340/147 R X |
| 3,732,543 | 5/1973 | Rocher et al. .................... | 340/172.5 |
| 3,755,786 | 8/1973 | Dixon et al. ..................... | 340/172.5 |
| 3,755,789 | 8/1973 | Collins ............................ | 340/172.5 |
| 3,781,478 | 12/1973 | Blahut et al. ................... | 179/15 AL |
| 3,875,391 | 4/1975 | Shapiro et al. .................. | 340/172.5 |
| 3,878,514 | 4/1975 | Faber ............................. | 340/172.5 |
| 3,879,710 | 4/1975 | Maxemchuk et al. ........... | 340/172.5 |
| 3,904,829 | 9/1975 | Martin et al. .................. | 179/15 AL |
| 3,914,746 | 10/1975 | Steinmetz et al. ............... | 340/172.5 |
| 3,921,137 | 11/1975 | McClearn et al. ............. | 340/147 R |
| 3,943,494 | 3/1976 | Holmes et al. .................. | 340/172.5 |
| B 496,500 | 2/1976 | Jones et al. .................... | 179/15 AL |

*Primary Examiner*—Gareth D. Shaw
*Assistant Examiner*—Jan E. Rhoads
*Attorney, Agent, or Firm*—Sughrue, Rothwell, Mion, Zinn & MacPeak

[57] ABSTRACT

In an information processing system of the type having widely dispersed terminals tied together by a series communications link, common data which is of interest to all stations is collected and registered in a simplified manner. The common information, consisting of the status of each of the stations, is collected by any station sending out a search instruction as part of an information word. As the information word passes through each successive station, each respective station adds a status bit to the information word indicating the status thereof. When the new-completed information word returns to the originating station, the common data is registered and displayed. Also the common data is sent, along with a "register common data" instruction, to all other stations via the communication link. Upon receipt of such information and instruction, each station registers and displays the common data.

8 Claims, 10 Drawing Figures

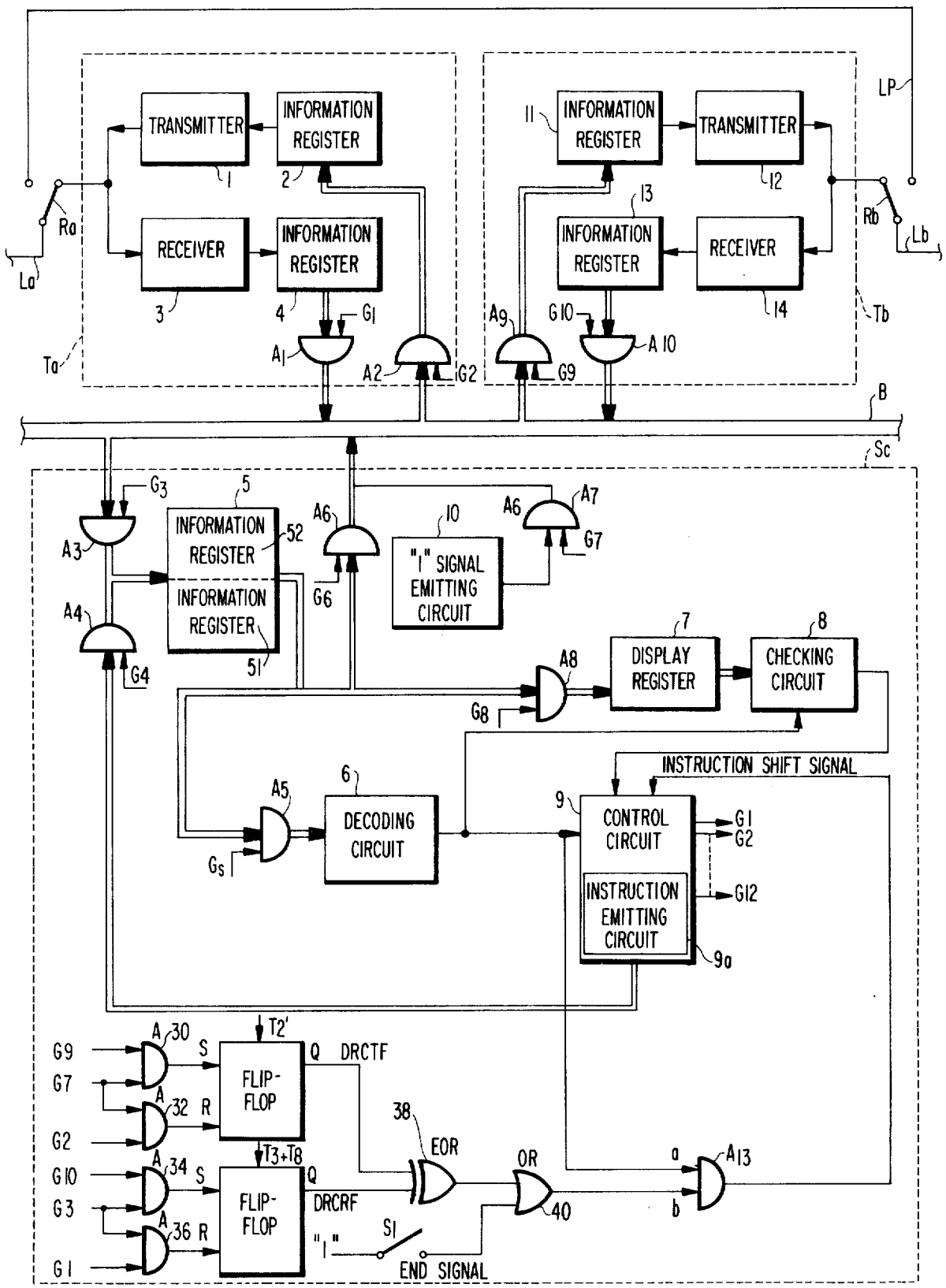

METHOD AND APPARATUS FOR TRANSMITTING COMMON INFORMATION IN THE INFORMATION PROCESSING SYSTEM

DESCRIPTION OF THE PRIOR ARTS

This invention relates to a method for transmitting common information in an information processing system of the type wherein plural information processing stations are dispersively located in a wide area and are connected in cascade through an information transmission line for the purpose of transmitting information between stations.

When information processing equipment is dispersed over a wide area such as in the case of an information processing system for controlling the movement of objects which are dispersed over a wide area, it has been proposed that such processing equipment be arranged into several groups, each group consisting of an information processing station for mutually transmitting information to subsidiary equipment within each group, and the several stations being connected by means of information transmission lines to mutually transmit information between the stations. In such an information processing system, since the required quantity and cost of transmitting lines is increased if each station is individually connected to every other station, plural information processing stations are typically connected in cascade by means of transmission lines $L_1-L_n$, as shown in FIG. 1 (a) and (b). FIG. 1(a) shows an open loop connection and FIG. 1(b) shows a closed loop connection.

Conventional construction of each information processing station in the information processing system is illustrated in FIG. 2. As shown, each station has a common information bus B controlled by a common station controller Sc, one or more information processing devices $D_1-D_n$, and either one or two communication terminals, Ta and Tb, each having bilateral communication facility. To each of the communication terminals Ta and Tb, external transmission lines La and Lb are connected through change-over switches Ra and Rb respectively for switching the lines to the bypass transmission line Lp when the station is out of order or is not in operation. The other ends of the external transmission lines La and Lb are connected to the communication equipment of other similar stations not shown in the FIGURE.

In such stations, all information transmission between each information processing device $D_1-D_n$ and each communication terminal, Ta and Tb, is carried out through the bus B under control of the station controller Sc, in a manner well known in the the art. When information is received at Ta or Tb of a given station, e.g., station Si, the controller of station Si detects the address transmitted with said information. If the information is addressed to one of the devices $D_1-D_n$ of station Si, the controller places said information into the designated device via bus B. If the information is addressed to a device in a station other than Si, the controller places the information in the transmission part of Ta or Tb via bus B for retransmission of said information to other stations. The controller also controls the transfer of information to and from bus B in a manner to prevent loss of synchronization and overlapping of information. When a communication terminal thus takes in the information from the bus B, it feeds the information taken in to the external transmitting line automatically and transmits the information to another station. When the communication equipment receives the information transmitted via the external transmitting line, it feeds the information to the bus B in the station under control of the controller Sc.

Therefore, when the communication terminal Ta receives information transmitted from a preceding station via external transmittion line La, the information is fed to the bus B under control of the controller Sc and then to the controller. The controller Sc reads the address of the information, and if the address is that of a processing device D in the station Si, for instance, the controller commands the processing device D to receive the information. If the address is that of a device at another station the controller commands the communication terminal Tb to accept the information and transmit it via external transmitting line Lb to the next succeeding station.

If a station stops operating for any reason, such as an electric failure, the change-over switches Ra and Rb operate to switch the contacts thereof from the communication terminals Ta and Tb to the by-pass transmitting line $L_p$ to connect the external transmission lines La and Lb with the by-pass transmission line $L_p$ and to disconnect the station S from the transmitting system.

In an information processing system of the type shown in FIG. 1(a) and FIG. 1(b), when information is dispatched from one station to another station, each station reads the address of the information transmitted from the preceding station. If the address is that of the receiving station, it accepts the information as previously described, and if the address is that of another station, it passes the information and transmits it to the following stations in order. The information therefore travels on the series or closed loop transmission line until the information reaches the station specified in the address portion of the information transmitted. In an information processing system of the open loop series constitution, such as shown in FIG. 1(a), the two end stations $S_1$ and $S_n$ differ from the other stations to some extent. That is, each of the stations $S_1$ and $S_n$ has one communication terminal and operates to receive the information transmitted thereto from stations $S_2$ and $S_{n-1}$, respectively, to read the address of the information, and to return the information to stations $S_2$ and $S_{n-1}$, respectively, unless, of course, the address is that of the end station. The function of reversing the direction of transmission of information may be provided in every station in the systems of FIG. 1(a) and FIG. 1(b).

In information processing systems of the type described, since each station not in working condition passes the information transmitted through the by-pass transmission line, the performance of transmission between the working stations is not impaired if a station stops operating.

However, if the addressee station is not working and information is transmitted thereto, such information will continue to circulate resulting in a decrease of efficiency of the system. If such ineffective information is accumulated, the transmission efficiency of necessary information becomes worse, and the transmission of information between stations becomes delayed.

To remove such defect, each station is provided with an indicating means for indicating the working conditions of all stations in the system. Dispatching of information to a given station is performed if the station to which said information is addressed is shown by the indicating means to be in working condition, but is prevented if said station is shown not to be in working condition. Since the data shown in the indicating means shows the working conditions of all stations, it has the same import, and can be treated as common data for all stations.

When such common data as that showing the working conditions of all stations in the above system is formed at one station and thereafter individually transmitted from said station to the other stations, there is the problem that it takes a long time to accomplish the collection and registration of the common data.

The object of the present invention is to remove the above problem.

SUMMARY OF INVENTION

To achieve the above object, in the information processing system wherein plural information processing stations are connected in cascade connection through an information transmission line, the common information for all stations is dispatched from an optional station together with a specified instuction, and is transmitted to all stations. In the circulating process, each station adds its own information to the common information, or takes the common information into itself.

BRIEF DESCRIPTION OF DRAWINGS

FIG. 9 is a block diagram similar to FIG. 3 with an additional logic circuit for permitting open or closed loop operation.

DETAILED DESCRIPTION

Figure 3:
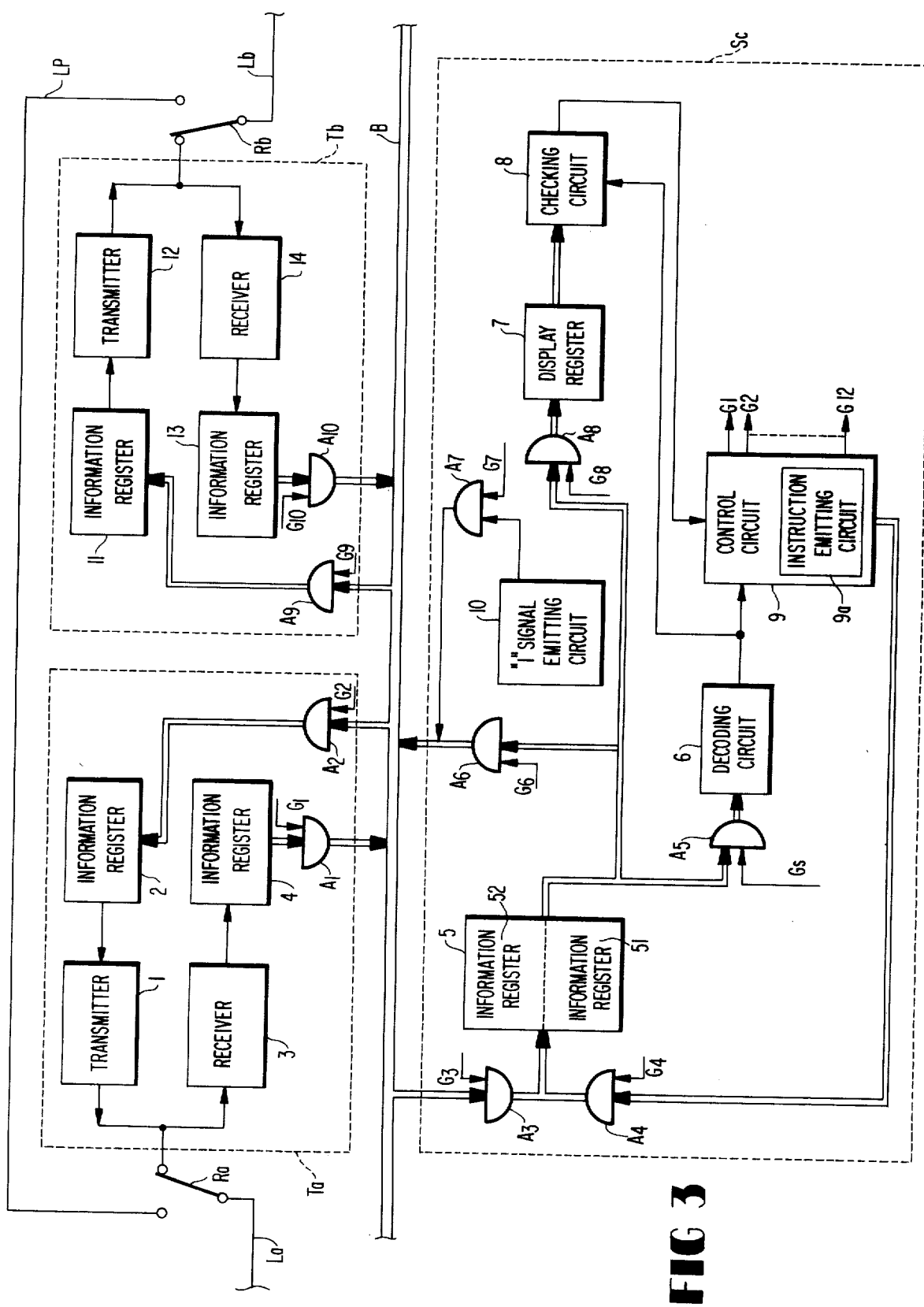
FIG. 3 is a block diagram of an information processing station with additional features embodying the invention.

FIG. 3 is a block diagram showing an example of the information processing station in accordance with the invention. All of the individual elements shown are known in the art. The order in which they operate to collect and disseminate the common information is novel. In communication equipment $Ta$ and $Tb$, 1 and 12 are transmitters, 3 and 14 are receivers, 2, 4, 11, and 13 are information registers comprising shift registers, and $A_1$, $A_2$, $A_9$ and $A_{10}$ are gates.

In the station controller $Sc$, 5 is an information register, 6 is a decoding circuit for decoding the instruction in the information register 5, 7 is a display register for displaying the working conditions of all stations, 8 is a checking circuit for the display register 7, 9 is a control circuit for emitting control signals $G_1$–$G_n$ to gates in said station in accordance with the outputs of reading or detecting circuit 6 and the check circuit 8, 9a is an instruction emitting circuit, 10 is a 1 signal emitting circuit, and $A_3$–$A_8$ are gates.

Figure 4:
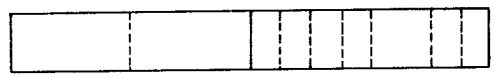
FIG. 4 shows the constitution of a word of information used in this invention.

That part of the operation of the above station which performs the process of forming the common data to display the working conditions of all stations and of registering the common data formed in the display register of all stations will now be explained. The information transmitted between each station consists of an operation part, containing an address and an instruction word, and the data part. The address part contains a required number of bits which normally indicates the addressee of the information, as shown in FIG. 4. The instruction word designates the type of instruction to be carried out. The construction of the information word may take many forms, and the one mentioned herein is only one example.

When information contained in the data part of said information word includes working conditions of all stations, the data part must have at least as many bit positions as the number of stations in the processing system. Each bit from 1 to $n$ in the data part is assigned to each station individually. For instance, the first bit is assigned to station $S_1$, whose station address is 1, and the $n$th bit to the station $S_n$, whose station address is $n$. Each bit is made 1 when the corresponding station is in working condition and is made 0 when the corresponding station is not in working condition.

Figure 5:
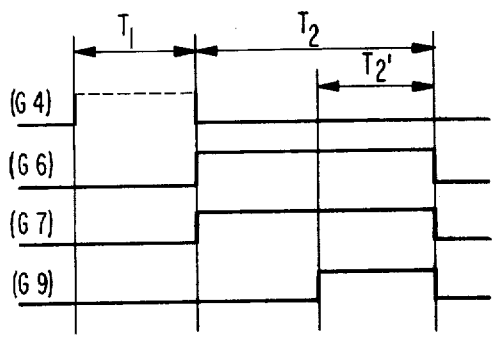
FIG. 5 – FIG. 8 are time charts of gate signals used in the illustration of operation of this invention.

In the station of FIG. 3, when it is required that the data be formed showing the working conditions of all stations, the instruction emitting circuit 9a of the station controller $S_c$ dispatches a station search instruction plus its own address and emits a gate signal $G_4$ at the time $T_1$ as shown in FIG. 5. Initiation of a search (also referred to as research) request can be the result of an operator depressing a key or the like, which is electrically connected to the controller. At $T_1$, therefore, gate $A_4$ is opened and the search instruction from the instruction emitting circuit 9a is gated into the operation area 51 of information register 5. In the address part of the operation part, the station's own address is written, and all the bits in the data area are made 0. Then at time $T_2$, gate signals $G_6$ and $G_7$ are emitted by the controller 9 to open gates $A_6$ and $A_7$ thereby placing the information set in information register 5 onto the bus B. Additionally, the 1 signal from the 1 signal emitting circuit 10 is inserted into the bit position the data part which is assigned to the subject station, through the gate $A_7$. At time $T_2'$, which is the latter half of the time $T_2$, gate signal $G_9$ gates open gate $A_9$ to pass the aforesaid information on bus B into information register 11 of communication equipment $Tb$. When the information is thus set in the register 11, the communication equipment $Tb$ begins transmission automatically, as is conventional, and reads the information in the register 11 in bit series and transmits it to the following station by means of the transmitter 12 through the transmitting line $Lb$. Hence, the emission of a station search instruction from the subject station is completed.

Figure 6:
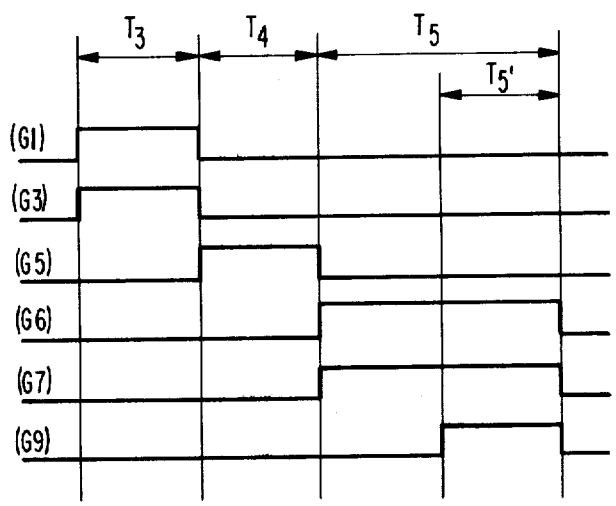

When the station of FIG. 3 receives information containing a search instruction from a distant preceding station via transmitting line $La$, the information is entered in information register 4 via receiver 3 in the order received. When the input is completed, the communication equipment $Ta$ demands the use of the bus B to the station controller $Sc$. The controller $Sc$ gives the communication equipment $Ta$ the permission immediately, unless the bus is presently in use, and emits gate signals $G_1$ and $G_3$ at the time $T_3$ shown in FIG. 6. The latter feature of operation is conventional. Gates $A_1$ and $A_3$ are opened by these signals to gate the information set in the register 4 onto the bus B and into the information register 5. At the following time $T_4$, gate signal $G_5$ opens gate $A_5$ to pass the instruction and address information from the instruction area 51 of register 5 into instruction reading circuit 6, which detects that the instruction is a research instruction, that it contains the address of a station other than itself, and thereupon emits a read signal. When the controller receives such read signal from the reading circuit 6, it emits gate signals $G_6$ and $G_7$ and opens gates $A_6$ and $A_7$ at the following time $T_5$. The information set in the register 5 is thus written onto the bus B, and at the same time, a 1 bit is added to the bit position of the information of the data part assigned to the subject station. At the following time $T_5'$, the gate signal $G_9$ from the controller 9 is applied to the gate $A_9$, and the information on the bus B is put in the register 11 of the communication equipment T$b$ and is thereafter transmitted to the following station by the emitter 12 via the transmission line L$b$. The same operation is carried out also in the succeeding stations.

Figure 1A:
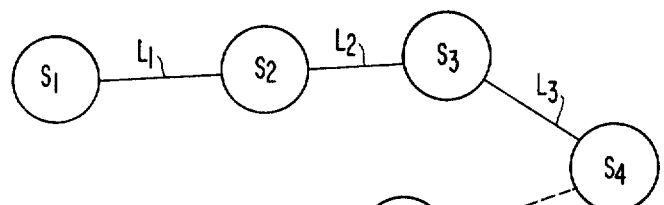
FIG. 1(a) and (b) shows a conventional interconnected stations of an information processing system to which the subject invention is applied.
Figure 1B:
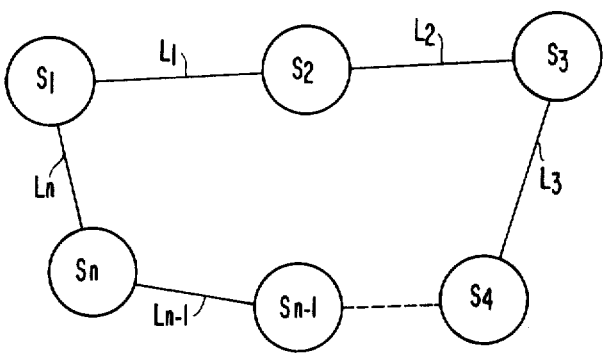
Figure 2:
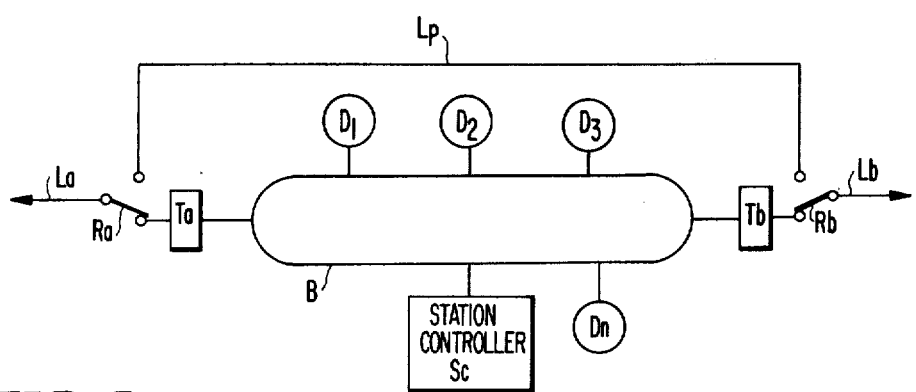
FIG. 2 shows a conventional information processing station to which the subject invention is applied.

Therefore, in an information processing system wherein $n$ stations are connected in a closed loop as shown in FIG. 1($b$), when a search instruction is emitted from the station $S_1$ with the address of $S_1$, the instruction will circulate through all stations in the order $S_2, S_3, S_4 \ldots , S_{n-a}, S_n$ and return to station $S_1$. In this process, since each working station adds a 1 bit to the bit position of the information word assigned to that station, the information word ultimately includes data showing the working condition of all stations when it returns to the station $S_1$. In the case where any station is bypassed, the corresponding bit position of the information word will contain a zero, indicating that said station is not in working condition.

The operation after the information containing search instruction returns to the station where the information is emitted is as follows.

Figure 7:
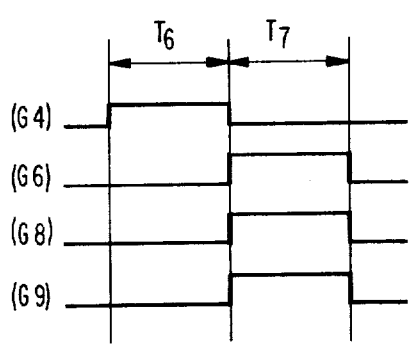

Assuming now that the information has circulated through all the stations and is received by the communication equipment T$a$ at the originating station, the operation is the same as previously described until the information arrives at decoding reading circuit 6. The decoder 6 detects that the information contains a search request and that the address is the address of the instant station. Thereafter decoder 6 sends a signal to controller 9 which places controller 9 in the registration mode for causing the display of all the working condition data previously generated. That is, a common data registration instruction is entered in the instruction emitting circuit 9$a$ and then gated by $G_4$ at the time $T_6$ of FIG. 7 via gate $A_4$ to the instruction part of the operation area 51 of register 5. The address of the subject station is set into the address part of the operation area. At the following time $T_7$, gate signals $G_6$, $G_8$ and $G_9$ are emitted by the controller 9 to open gates $A_6$, $A_8$ and $A_9$. The information set in the information register 5, (which includes the working condition information, the common data registration instruction, and the address of the subject station), is written on the bus B and put in the register 11 of the communication equipment T$b$. At the same time, the information portion of data area of the register 5 is put in the display register 7. Hence, the data showing the working condition of all stations is registered in the display register 7. The communication equipment T$b$ performs the transmission operation automatically after the time $T_7$ and dispatches the information put in the register 11 to the transmission line L$b$ by means of the emitter 12 to transmit it to the following station. It will be recognized that decoder or instruction reader 6 is a conventional device and may, for example be a matrix decoder having plural output leads which are selectively energized depending upon the input instruction word received. Substantially every kind of computer known includes an instruction reader which performs similarly.

Figure 8:
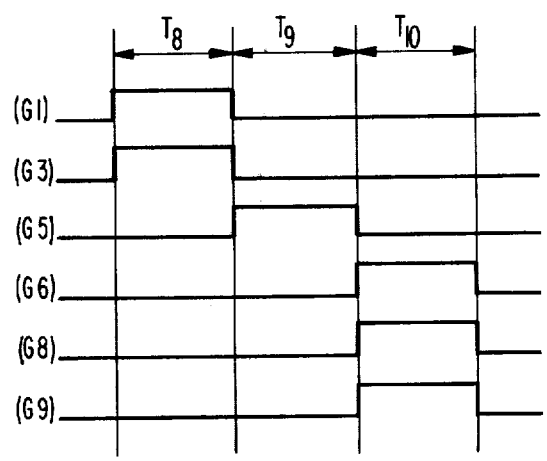

Stations other than the station emitting the information work as follows. Upon receipt of information containing a common data registration instruction transmitted from the preceding station by the transmitting line L$a$, the information is put in the information register 4 of the communication equipment T$a$ by the receiver 3. According to the demand for the use of the bus from the communication equipment T$a$, the controller S$c$ gives gate signals $G_1$ and $G_3$ to gate $A_1$ and $A_3$ at the time $T_8$ of FIG. 8, and puts the information set in the register 4 into the information register 5 of the register S$c$. At the time $T_9$, the gate signal $G_5$ opens gate $A_5$ to lead the instruction information from the information register 5 to the instruction reading circuit 6. The latter circuit detects the address and the instruction of this information. Hence, it is detected that the instruction of the information is addressed to the other stations and is the registration instruction of the common data, and the result of this detection is transmitted from the read circuit 6 to the controller 9. Accordingly, the controller 9 emits the gate signals $G_6$, $G_8$, and $G_9$ at the time $T_{10}$ to open gates $A_6$, $A_8$, and $A_9$. Therefore, the information set in the information register 5 is put in the information register 11 of the communication equipment T$b$ through the bus B, and the information of the data part of the register 5 is also put in the display register 7. Then, the communication equipment T$b$ operates after the time $T_{10}$, and dispatches the information set in the information register 11 to the transmission line L$b$ by means of the emitter 12 and transmits it to the following station. By this operation, the data showing the working condition of all stations, which is the common data, is registered in the display register 7 also in this station, and the working conditions of all stations is displayed. The operation of the checking circuit 8 shown in FIG. 3 does not form an inventive feature of the present invention. However, it is preferable to include such a checking circuit for responding to the common data in register 7 and to other information for influencing the controller to block transmission of information destined for a non-operating station. One example of such a system is the subject of copending commonly assigned U.S. application Ser. No. 657,663, filed Feb. 12, 1976, and entitled "An information processing system," (corresponds to Japanese patent application 50-17629).

In the information processing system of the closed loop type, since each station operates as mentioned above, when the common data is emitted with the common data registration instruction from the station $S_1$ for instance, the data circulates through each station in the order as $S_2, S_3, S_4 \ldots , S_{n-1}, S_n$, and returns to the station $S_1$. Since the common data is put in each station during this circulating process, it is registered in all stations. The station $S_1$, where the data originated, completes the registration of the common data and does not emit the same data to the other stations again, by detecting that the information containing a common data registration instruction emitted by itself has circulated through all stations and has returned.

Although the information processing system of the open loop series constitution, as shown in FIG. 1($a$), is not described above, if both end stations $S_1$ and $S_n$ in such processing system are made to operate as follows, the formation and the registration of the common data can be performed in the same manner as that described above. Both end stations $S_1$ and $S_n$ are of the same constitution as the stations shown in FIG. 3 with exception that there is only one communication equipment, $Ta$ for instance. The receiver 3 of the communication equipment $Ta$ of the station receives the information transmitted from the preceding station through the transmission line $La$, puts the information in the information register 4, and as described above, transfers the information to the information register 5 of the controller $Sc$. The instruction information contained in this information is detected by the reading circuit 6, and when the information is addressed to the other stations, the gate signals are given from the control circuit 9 to the gates $A_6$ and $A_2$. The information set in the register 5 is thus written on the bus B through the gate $A_6$, and the information written on the bus B is put in the information register 2 of emitting side of the communication equipment $Ta$ through the gate $A_2$. Then, the information put in the register 2 is dispatched to the transmission line $La$ by the emitter 1, and returned to the preceding station.

In the processing system of the open loop series constitution, when the common data is emitted from an optional station for registration, and made to circulate through all stations and to return to the station where the data has been emitted, the common data passes twice through intermediate stations, $S_2, S_3, S_4, \ldots S_{n-1}$, dissimilar to the processing system of closed loop constitution. To eliminate such futility in the processing system of the open loop series constitution, if the station emitting the data is confined to the end station $S_1$ or $S_n$, and the common data transmitted from one end stations $S_1$ is addressed to the other end station $S_n$, the cycle of the common data becomes once for each station.

FIG. 9 shows the system of FIG. 3 with a simple logic addition that permits a given station to operate as the initiating station in either closed or open loop. This figure is not shown in the priority application. The logic addition comprises AND gates 30, 32, 34 and 36, transmission flip flop DRCTF, receiver flip flop DRCRF, exclusive-OR gate 38, OR gate 40, and AND gate $A_{13}$. In general, the device shown operates only in the initiating station because the address output from decoder 6, indicating one's own station address, is applied as the $a$ input to gate $A_{13}$. The output of gate $A_{13}$ is simply a signal which informs the controller to shift to the next operation, i.e., shift from the "request information" operation to the "load common information," etc. The status of the two flip flops indicate whether or not the data received is from the same direction or a different direction. For example, in closed loop operation the "request" send out via $Tb$ will be received via $Ta$. It is then time to shift to the next operation. But in open loop, assuming the initiating station is an intermediate station, e.g., $S_3$, the request sent via $Tb$ will initially be returned via $Tb$. To complete the operation it is necessary to send the request via $Ta$ to stations $S_2$ and $S_1$. The flip flops are operated by the same gating signals that direct the common information. Thus, during time $T_2'$, when the request is being initiated, if $G_7$ and $G_8$ are up DRCTF if SET. If $G_7$ and $g_2$ are up, DRCTF is RESET. Thus DRCTF is SET if the information is sent via $Tb$ and reset if sent via $Ta$. Flip flop DRCRF is SET and RESET at time $T_3$, when the request is received, and at time $T_8$, when the status information is received. DRCRF is SET when the common information is received from $Tb$ and is RESET if received from $Ta$. When the output of EOR 38 is a 1, indicating data sent from one terminal of the station has been received at the other terminal of the station, $A_{13}$ is energized as previously described. It will be noted that $A_{13}$ can be energized under manual control by closing switch $S_1$.

As the above description points out, in the method of this invention, when the common information is collected from plural stations connected in cascade connection, or when the common information is transmitted to plural stations, since the information containing a specified instruction emitted from an optional station is made to circulate through all stations, and in this process, each station adds its own information to said information or registers the information, the collection and the transmission of the common information are performed by only one transmission of the information. According to this invention, therefore, the effect is to greatly reduce the time for the performance of the collection and the transmission of the common information in comparison with the method for transmitting the information individually from each station to every other station. This effect is the more remarkable as the number of stations increases, and therefore, this invention is very useful in large scale information processing systems.

What is claimed is:

1. In an information processing system of the type having a plurality of widely dispersed stations connected in cascade via a communications link, a method of collecting and disseminating common data, said method comprising, a. dispatching from an optional one of said stations an information word containing at least an instruction part and a data part, said instruction part containing a search instruction, said information word being dispatched in a manner to travel to said stations consecutively via said communications link and return to said dispatching station, b. receiving said information word with said search instruction at each said station in operating condition, and inserting common data existing at said station into the data part of said information whereby the data part becomes loaded with common data from said operating stations including said dispatching station, and c. altering the instruction portion of said information word after it has its data part loaded with common data from all said operating stations including said dispatching station and sending said altered information word to said stations via said link for registration of said common data, and d. at each said station, receiving said information word with said altered instruction portion, detecting said altered instruction portion and registering the common data contained in said information word.

2. The method of claim 1 wherein the step of dispatching said information word comprises, a. entering into an information word register, having at least a data part and address part and an instruction part, a search instruction code, said latter code being entered into said instruction part, b. entering into said address part of said information word register a code indicative of the address of the final station intended to receive said information word with said search instruction, and c. adding to the information word in said information register, an item of common data originating at said dispatching station, and then sending said information word to other said stations via said communication link.

3. The method of claim 2 wherein the step of receiving and inserting comprises,
 a. detecting the presence of said search instruction code in an information word arriving at said station via said communications link,
 b. detecting the presence of an address of another station in said information word arriving at said station via said communications link,
 c. adding a locally existing common data to the data part of said information word which is detected to have said instruction and said address codes as specified in the prior detecting steps, and
 d. sending said arrived and detected information word with said added common data to the next adjacent station via said communication link.

4. The method of claim 3 wherein the step of altering and sending comprises,
 a. receiving said information word at said final station,
 b. detecting the presence of said search instruction code in said received information word,
 c. detecting the presence of said final station's own address in said received information word, and
 d. after detecting said search instruction and said own address, substituting a "register common data" instruction for said search instruction in said information word, and,
 e. sending said thus altered information word to all said stations via said communications link.

5. The method of claim 4 wherein said common data indicates the operating status of each station and wherein the step of inserting said common data comprises inserting a 1 bit into a single bit slot of said data part reserved for the inserting station.

6. The method of claim 4 wherein said optional dispatching station and said final station are the same station.

7. The method of claim 6 wherein said stations are linked in a closed loop by said communications link.

8. The method of claim 4 wherein said stations are linked in an open loop, said loop being open between two of said stations serving as terminal stations, and wherein one of said terminal stations is said optional stations and the other of said terminal stations is the final station.

* * * * *